UNITED STATES PATENT OFFICE.

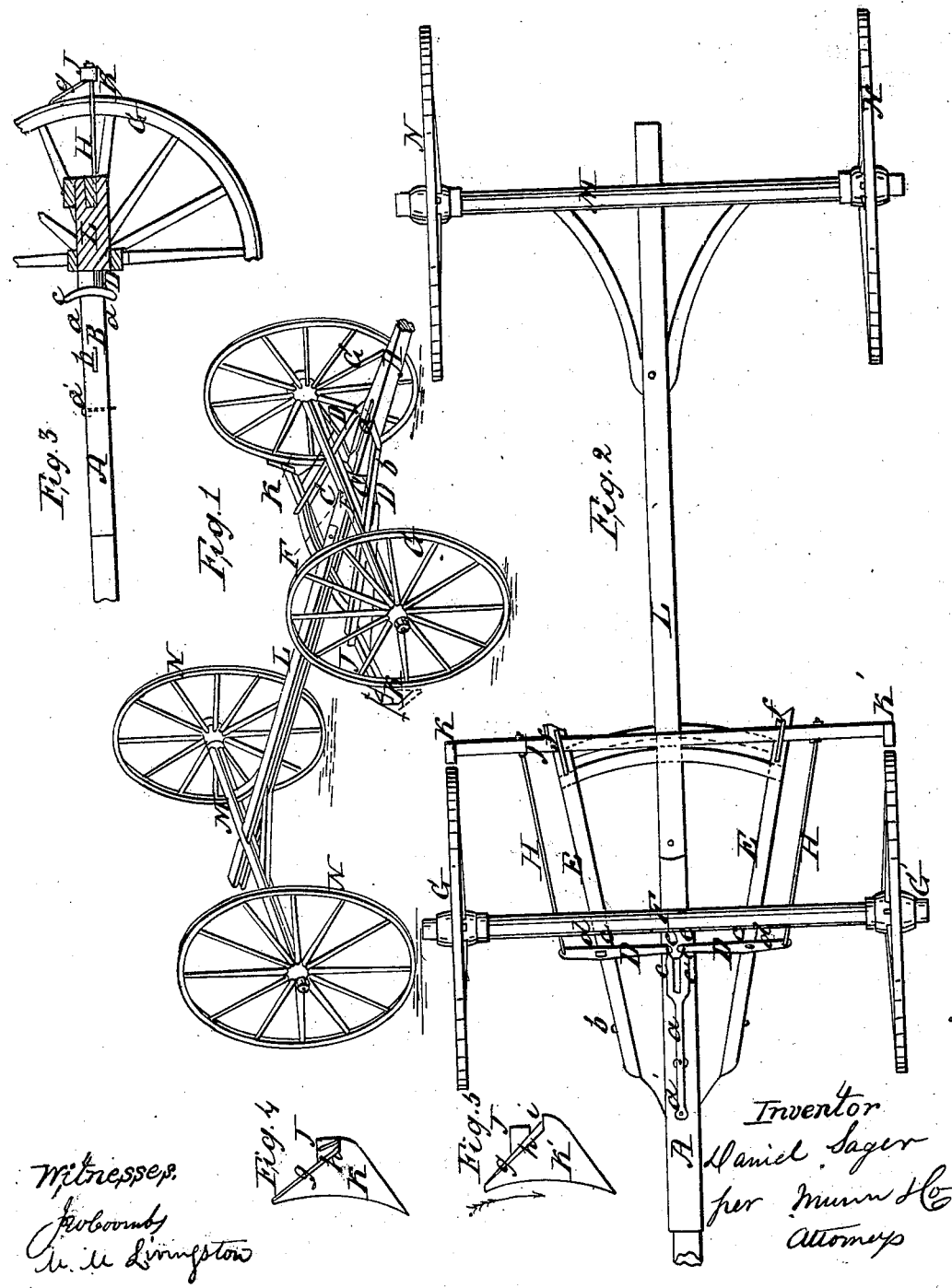

DANIEL SAGER, OF ALBANY, NEW YORK.

IMPROVEMENT IN SELF-ACTING BRAKES FOR WHEEL VEHICLES.

Specification forming part of Letters Patent No. 34,527, dated February 25, 1862.

*To all whom it may concern:*

Be it known that I, DANIEL SAGER, of Albany, in the county of Albany and State of New York, have invented a new and Improved Self-Acting Brake for Wheel Vehicles; and I do hereby declare that the following is a full, clear, and exact description of the same, reference being had to the accompanying drawings, making a part of this specification, in which—

Figure 1 is a perspective view of the running-gear of a wheel vehicle with my invention applied to it; Fig. 2, an inverted plane of the same; Fig. 3, a longitudinal vertical section of the front part of the same; Fig. 4, a detached and enlarged side view of one of the brake-blocks. Fig. 5 is the same view as Fig. 4, with the exception that the brake-block is shown in a depressed position caused by the backward movement of the wheel.

Similar letters of reference indicate corresponding parts in the several figures.

The object of this invention is to obtain a brake for wheel vehicles which will be self-acting—that is to say, operate under the draft movement of the team and the gravity of the vehicle and its load—so as to require no special manipulation on the part of the driver neither during the forward movement of the vehicle nor in backing the same, and at the same time admit of the draft-pole having a perfectly-free rising and falling movement without in the least affecting the brake mechanism.

Draft movement of the team throws the brake-blocks K K free from the wheels G G, the levers D D, which are connected to the links C C, actuating the brake-bar J through the medium of the rods H H. The brake-blocks therefore cannot be casually applied to the wheels during the draft movement. The levers D D, in consequence of being allowed a longitudinal sliding movement, as previously alluded to, are prevented from exerting any undue lateral strain against the rods H—a contingency which would occur had the levers D D an arbitrary circular movement.

In descending hills the brake-blocks are applied to the wheels by the forward movement of the vehicle, due to the gravity of the same and its load. The team being checked in its forward movement, the vehicle advances and thereby actuates the levers D D and causes the brake-blocks to be applied. The draft-pole A, it will be seen, is allowed to rise and fall freely in consequence of the play or movement of the links C C in the inner ends of the levers D D. The forward movement or rotation of the wheels G has a tendency to keep the brake-blocks K firm against the bar J; but when the driver backs the team the wheels bear against the upper parts of the brake-blocks and force the same obliquely downward and outward from them. The resistance therefore that the brake-blocks K K offer to the wheels G G in backing is only due to the strength of the springs $i$, and that is very slight, as said springs are only designed to be sufficiently strong to bring the blocks K K back to their original position when the backward movement of the vehicle ceases. This arrangement of the brake-blocks is an important feature of the invention, as it effectually prevents the brake-blocks from interfering with the backing of the vehicle without in the least detracting from their efficiency or legitimate operation.

The reach L, back axle M, and wheels N N are arranged in the usual way, and therefore do not require a minute description.

I am aware that brakes for wheel vehicles have been so constructed and connected with the draft-pole as to be self-acting, and I do not claim, broadly, such device irrespective of the particular construction and arrangement herein shown and described for effecting the result.

I claim, therefore, as new and desire to secure by Letters Patent—

1. The combination of the curved links C C with the pole A and levers D, as herein shown and described.

2. The arrangement of the levers D D to slide longitudinally as well as turn circularly upon the axis-pin, as herein shown and described.

DANIEL SAGER.

Witnesses:
CHARLES W. MINK,
E. K. BRADBURY.